(12) United States Patent
Caron

(10) Patent No.: US 8,424,363 B2
(45) Date of Patent: Apr. 23, 2013

(54) CALIBRATION OF VIBRATORY GYROSCOPE

(75) Inventor: Jean-Michel Caron, Paris (FR)

(73) Assignee: Sagem Defense Securite, Paris (FR)

(*) Notice: Subject to any disclaimer, the term of this patent is extended or adjusted under 35 U.S.C. 154(b) by 82 days.

(21) Appl. No.: 13/130,691

(22) PCT Filed: Nov. 27, 2009

(86) PCT No.: PCT/EP2009/066000
§ 371 (c)(1),
(2), (4) Date: May 23, 2011

(87) PCT Pub. No.: WO2010/060993
PCT Pub. Date: Jun. 3, 2010

(65) Prior Publication Data
US 2011/0232359 A1    Sep. 29, 2011

(30) Foreign Application Priority Data
Nov. 28, 2008   (FR) ...................................... 08 58146

(51) Int. Cl.
*G01C 17/38*    (2006.01)
(52) U.S. Cl.
USPC ........................................................ 73/1.77
(58) Field of Classification Search ........................ None
See application file for complete search history.

(56) References Cited

U.S. PATENT DOCUMENTS 5,414,320 A * 5/1995 Mashio ........................ 310/311
7,117,605 B2  10/2006 Ekseth et al.

FOREIGN PATENT DOCUMENTS

| EP | 1 571 417 | 9/2005 |
|---|---|---|
| FR | 2 755 227 | 4/1998 |
| FR | 2 904 870 | 2/2008 |
| WO | WO 2009/083519 | 7/2009 |

OTHER PUBLICATIONS

International Preliminary Report on Patentability dated Mar. 28, 2011 for Application No. PCT/EP2009/066000.
International Search Report dated Feb. 24, 2010 for Application No. PCT/EP2009/066000.
Shkel, A.M., "Type I and Type II micromachined vibratory gyroscopes," IEEE/ION, PLANS 2006, San Diego, CA, pp. 586-593.
Abstract for FR 2755227, Apr. 2011.
Gelb, Arthur, "Synthesis of a Very Accurate Inertial Navigation System", IEEE Transactions on Aerospace and Navigational Electronics, Jun. 1965.

* cited by examiner

*Primary Examiner* — Robert R Raevis
(74) *Attorney, Agent, or Firm* — Frost Brown Todd LLC

(57) ABSTRACT

A gyroscopic system comprises at least four vibratory gyroscopes capable of changing vibration position. A first measurement is provided by a gyroscope to be calibrated and a second measurement is provided by a combination of the respective measurements from the other gyroscopes of the system, these first and second measurements being carried out along the same measurement axis. The determination (12) of a measurement drift value between the first measurement and the second measurement is followed by a command (13) to change the vibration position of the gyroscope to be calibrated to another vibration position and a drift value is again determined. The vibration position change command and the determination of a drift value are repeated (14) K times, K being a positive integer. Then, a drift model is generated (15) as a function of the vibration position of the gyroscope to be calibrated on the basis of the drift values obtained.

13 Claims, 2 Drawing Sheets

CALIBRATION OF VIBRATORY GYROSCOPE

BACKGROUND

The present invention relates to vibratory gyroscopes the principle of which is based on the Coriolis effect and relates more particularly to the calibration of this type of gyroscope.

As with any measurement device, a calibration step is required on a vibratory gyroscope, i.e. a step during which the corrections to be made to the rough measurement value of the device are defined, in order to improve its precision as a function of various parameters measured in addition, such as the temperature, the measured value or the vibration position in the particular case of axisymmetric vibratory gyroscopes used in whole angle mode (free vibration) in such a way that this measurement device operates correctly.

Conventionally, a vibratory gyroscope is calibrated before being used. It can thus be calibrated on leaving the factory, for example.

The calibration of a gyroscope can make it possible to provide relevant measurement values over a certain period of time. But, in the course of time, such a vibratory gyroscope exhibits measurement deviations that can result in particular from a degradation of its calibration parameters. As a result, after a certain period of time of use of the vibratory gyroscope, it is possible for the measurement values provided by the gyroscope to be impaired by a drift error as a function of the temperature or as a function of the vibration position. In the particular case of axisymmetric vibratory gyroscopes used in whole angle mode, the changes over time in the measurement deviation dependent on the vibration position is one of the major causes of errors of the device.

It is therefore preferable to make provision to implement a gyroscope calibration step, with respect to this type of deviation, several times during a use of a gyroscope. However, while such a calibration step is being implemented, the gyroscope cannot be used as a precise measurement device.

The present invention will improve the situation.

SUMMARY

A first aspect of the present invention proposes a method of calibrating a gyroscope to be calibrated in a gyroscopic system comprising at least four vibratory gyroscopes capable of changing vibration position among a plurality of vibration positions;

a first measurement being provided by said gyroscope to be calibrated and a second measurement being provided by a combination of the respective measurements from the other gyroscopes of said system, said first and second measurements being carried out along the same measurement axis;

said calibration method comprising the following steps for the gyroscope to be calibrated, which vibrates in one of the vibration positions:

/1/ determining a measurement drift value between said first measurement and said second measurement;

/2/ commanding the change in vibration position of the gyroscope to be calibrated to another vibration position of said plurality of vibration positions and iterating step /1/;

/3/ iterating step /2/ K times, K being a positive integer; and

/4/ generating a drift model as a function of the vibration position of the gyroscope to be calibrated on the basis of the drift values obtained in the iterations of step /1/.

The combination of the measurements can be a linear combination.

Here, the term 'drift model' corresponds to a modelling of the drift values (or "discrepancy values") affecting the measurement values of a vibratory gyroscope as a function of its vibration position.

It should be noted that the first measurement and the second measurement can correspond to angle values or rotational speed values. A vibratory gyroscope can be used either in a "whole angle" mode wherein it provides angle measurement values, or in a "rate" mode wherein it provides angular rate measurement values.

Due to the arrangements of such a method, it is advantageously possible to implement a step of calibrating a vibratory gyroscope even while the gyroscopic system considered continues to provide relevant gyroscopic information.

Due to this calibration step, a drift model is obtained on the basis of which it is possible to correct the values measured by the corresponding vibratory gyroscope. This drift model makes it possible to correspond a measurement drift value to a vibration position of the gyroscope. Thus, the value measured by the vibratory gyroscope, which vibrates in a specific vibration position, can be easily corrected by taking the associated drift error into account.

It is thus possible to update the drift model at any time, and therefore, regularly, without disturbing the information provided by the gyroscopic system.

Such a calibration method is based on the introduction into a gyroscopic system of an additional vibratory gyroscope with respect to the number of vibratory gyroscopes used by the gyroscopic system in order to provide the gyroscopic information, or the navigation indications, to a user. This additional gyroscope, associated with the other gyroscopes of the system not in calibration phase, constitutes a measurement reference making it possible to measure the errors of one of the other gyroscopes that one wishes to calibrate.

Advantageously, such a method can be implemented by using an additional gyroscope of the same kind as the gyroscopes used to provide the navigation indications, i.e. with performance similar to that of the gyroscopes that one wishes to calibrate. There is therefore no need to introduce, as an additional gyroscope, a better-quality and therefore more expensive gyroscope.

This advantage is based on the fact that an axisymmetric vibratory gyroscope has an average drift over one rotation of the vibration position that is more than one order of magnitude more stable than its drift for any position of this vibration. As a result, identification is sought, during the calibration steps of a method according to an embodiment of the present invention, of a drift component that is dependent on the vibration position, its average value being a priori considered as stable and requiring no calibration.

Such an implementation makes it possible to calibrate a vibratory gyroscope with a precision more than ten times greater than the absolute precision of the additional vibratory gyroscope used for this calibration.

The gyroscopic system can for example comprise four vibratory gyroscopes, three vibratory gyroscopes that are arranged respectively along three orthogonal axes, the fourth vibratory gyroscope being arranged along the trisectrix of said three orthogonal axes.

Advantageously, measurements provided by the vibratory gyroscope, for which a drift model has been generated in step /4/, are corrected on the basis of this drift model.

In an embodiment of the present invention, it is possible to obtain a specific drift value by also carrying out step /1/ over a period of time corresponding to the change in vibration position of the gyroscope to be calibrated, this specific drift value being used in order to calibrate a scale factor of the gyroscope to be calibrated.

In the gyroscopic system considered, a measurement provided by the gyroscope to be calibrated can easily be replaced by a combination of measurements from the other gyroscopes of the system, which are not undergoing calibration. The first and second measurements are provided along the same axis.

When the gyroscopic system provides navigation information on the basis of respective measurements from a set of at least three specific vibratory gyroscopes, during the implementation of steps /1/ to /4/ on a gyroscope to be calibrated among this set of three gyroscopes, the measurement from the gyroscope to be calibrated, on the basis of which the navigation information is provided, can advantageously be replaced by a measurement along the same measurement axis as this gyroscope to be calibrated, obtained by combining the respective measurements from the other two vibratory gyroscopes of this set of three gyroscopes and at least one fourth vibratory gyroscope.

Then, on completion of the application of the calibration method according to an embodiment of the present invention, provision can then be made to return to the trio of the first three gyroscopes in order again to base the navigation indications of the gyroscopic system on these first three gyroscopes.

In the latter case, when the gyroscopes are used in whole angle mode and not in rate mode, it is then possible to envisage that the calibration method also comprises the following steps:

/a/ over a first period of time, simultaneously providing, on the same measurement axis, first angle values by the vibratory gyroscope to be calibrated and second angle values on the basis of a combination of the measurements provided respectively by the other gyroscopes of the system; and deducing from these, second angle values modified by adapting the zero reference of the second values and of the first values;

/b/ over a second period of time, carrying out steps /1/ to /4/ on the gyroscope to be calibrated;

/c/ over a third period of time, providing both first angle values by the gyroscope to be calibrated and second angle values; and deducing from these, first angle values modified by adapting the zero reference of the first angle values and of the second angle values.

Due to these arrangements, it is possible to rotate the vibration position of the vibratory gyroscope to be calibrated, while continuing to provide relevant angle measurement values.

Here, provision is made to adapt the zero reference of the first values provided by the gyroscope to be calibrated with the zero reference of the second values based on a combination of the measurements provided by the other gyroscopes. By proceeding in this way, it is therefore possible to provide angle values consistent with each other throughout the process of calibration of the vibratory gyroscope. Whether the angle values measured are provided by the gyroscope to be calibrated or by a combination of the measurements from the other gyroscopes, these angle values are advantageously modified with respect to their reference zeros used respectively.

No limitation is placed on the number of vibration positions wherein the configuration of the vibratory gyroscope is envisaged.

However, by proceeding in this way, the measurements provided by the gyroscopic system considered can be impaired by disturbance linked to the changeover of the measurements, i.e. to the fact that the navigation indications provided by the system are not always based on the same vibratory gyroscopes of the system.

In order to eliminate such disturbance, it is possible to provide that the navigation indications provided by the gyroscopic system according to an embodiment of the present invention, are always based on the measurements obtained from the same set of vibratory gyroscopes, thus avoiding the changeovers between vibratory gyroscopes when taking measurements into account for the navigation indications.

In this case, during the implementation of steps /1/ to /4/ on a gyroscope to be calibrated among the set of three gyroscopes, the measurement from the gyroscope to be calibrated, on the basis of which the navigation information is provided, is corrected as a function of a combination of the measurements provided by the gyroscopes of the system other than the gyroscope to be calibrated.

Thus, the navigation indications can always be based on the measurements originating from the same set of vibratory gyroscopes whilst guaranteeing that the navigation indications are relevant even during a change in vibration position of one of the vibratory gyroscopes in the set of the gyroscopes considered. In fact, provision is advantageously made here to correct the measurement provided by the vibratory gyroscope undergoing calibration by carrying out a linear combination of the measurements provided by the other vibratory gyroscopes in order to obtain a measurement along the same measurement axis as that carried out by the vibratory gyroscope undergoing calibration.

In such an architecture, the vibratory gyroscope to be calibrated can advantageously be subjected to a calibration step that disturbs the measurement values that it provides but that will not disturb the values that will be provided by the gyroscopic system, the latter correcting them using a combination of the measurement values provided by the other gyroscopes.

The implementation of steps /1/ to /4/ on the set of the three gyroscopes of the system can be consecutive, i.e. steps /1/ to /4/ are applied consecutively to each gyroscope in this set of gyroscopes, or overlapped, i.e. each step from /1/ to /4/ is applied on all of the at least three gyroscopes successively.

Thus, the at least three gyroscopes in the set can be calibrated by generation of a drift model by applying steps /1/ to /4/ consecutively to each one. Or, these at least three gyroscopes in the set can be calibrated by generation of a drift model by applying step /1/ to each of the gyroscopes successively, then step /2/ to each of the gyroscopes successively, then step /3/ to each of the gyroscopes successively and finally step /4/ to each of the gyroscopes successively.

In order to calibrate a vibratory gyroscope of this gyroscopic system, it is here provided to generate a drift model associated with the measurement values provided by this gyroscope as a function of its vibration position, since the drift attached to the measurement values provided by a vibratory gyroscope is a drift value that is a function of the vibration position of the vibratory gyroscope concerned.

Based on such a drift model, the measurement values provided by the vibratory gyroscope can then be corrected as a function of the vibration position of the gyroscope.

By repeating K times step /2/ of the calibration method, K drift values are obtained, or K drift error values, corresponding preferably to K different vibration positions respectively.

Based on such a series of discrete values, it can be advantageous to obtain a continuous drift model, i.e. that makes it possible to obtain a drift error value for any vibration position of the vibratory gyroscope.

Such a drift model, as a function of vibration position, can be obtained by interpolation of the drift values obtained in the iterations of step /1/. Provision can be made here to estimate or calculate intermediate values in the series of drift values determined during the iterations of step /1/, for example by applying a linear interpolation to the series of drift values obtained.

In an embodiment of the present invention, the drift model as a function of vibration positions is obtained by polynomial analysis of the drift values obtained in the iterations of step /1/.

Provision can also be made to switch from the series of discrete drift values obtained in the iterations of step /1/ to a drift error model, by carrying out a harmonic analysis of the values of this series, on the basis of a Fourier series. Such modelling is suited to the vibratory gyroscope since the physical causes at the origin of drift of this type of gyroscope dependent on the vibration position generate a sinusoidal type drift of the order of n (n being an even integer) over one rotation and the average value of this drift remains relatively stable over time.

The measurement values relate to one measurement among the set of measurements comprising an angle measurement and an angular rate measurement.

A second aspect of the present invention proposes a gyroscopic system suited to the implementation of a calibration method according to the first aspect of the present invention.

BRIEF DESCRIPTION OF THE DRAWINGS

Further characteristics and advantages of the invention will also become apparent on reading the following description. This is purely illustrative and must be read in light of the attached drawings, wherein.

DESCRIPTION OF PREFERRED EMBODIMENTS

Hereafter, the present invention is described in its application to the Type I gyroscopes. These Type I gyroscopes correspond to axisymmetric gyroscopes of the Coriolis Vibratory Gyroscope (CVG) type, such as for example of the Hemispherical Resonator Gyroscope (HRG) type, as described in the document 'Type I and Type II micromachined vibratory gyroscopes' by Andrei M. Shkel, pages 586-593, IEEE/ION (Institute of Electrical and Electronics Engineers/Institute Of Navigation' PLANS 2006, San Diego, Calif., USA).

These gyroscopes can operate in an open loop, i.e. in whole angle mode. They then make it possible to measure an absolute rotation angle on the basis of a measurement of an angle representing the vibration position of the gyroscope with respect to measurement electrodes.

Such a gyroscope can also be used in a closed loop by controlling the vibration position a precession command, as described in particular in document FR 2 755 227. In this case, the vibration position of the gyroscope is maintained in a fixed position, and the measurement is deduced from the command that it is necessary to apply to the gyroscope in order to maintain it in this fixed vibration position. This type of operation is also called "rate" mode. The values provided by the physical measurement then no longer correspond to an angle but to a speed of rotation.

When they are used in whole angle mode, the measurements provided by these vibratory gyroscopes can be affected by errors, or by drift values, which are essentially a function of the vibration position with respect to the measurement electrodes.

These errors have the effect of degrading the level of precision of the values thus measured. It is therefore useful to seek to reduce these errors in order to improve the performance of this type of vibratory gyroscope.

Figure 1:
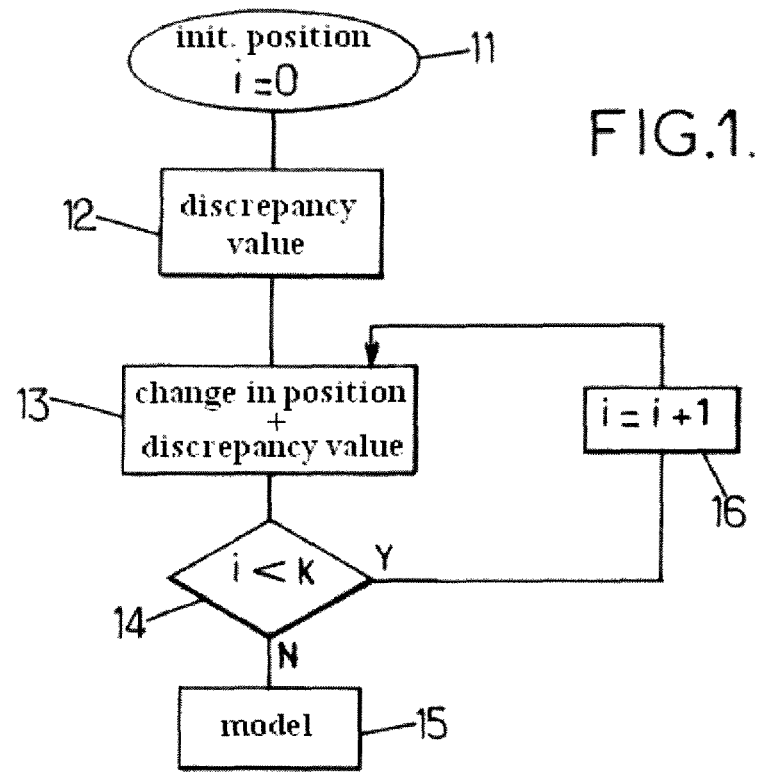
FIG. 1 illustrates the main steps of a calibration method in a gyroscopic system according to an embodiment of the present invention.

FIG. 1 illustrates the main steps of a calibration method in a gyroscopic system according to an embodiment of the present invention.

The gyroscopic system wherein the method of calibrating vibratory gyroscopes is implemented comprises at least four vibratory gyroscopes. In an embodiment, three gyroscopes among the four of the gyroscopic system are always used in order to provide the information on the gyroscopic system, the fourth being an additional vibratory gyroscope intended to allow the implementation of a calibration of one of the other three without disturbing the indications provided by the gyroscopic system. However, the present invention also covers an embodiment wherein the information provided by the gyroscopic system comes from the three gyroscopes out of the four that are not undergoing calibration, as described above.

A step 11 corresponds to a step of initialization of the vibration position of the vibratory gyroscope to be calibrated. This initial vibration position can correspond to the current vibration position of the vibratory gyroscope at the moment when the calibration method is implemented. When the vibratory gyroscope has already been subjected to this calibration method during a previous period of time, this initial vibration position in step 11 can then be the vibration position reached on completion of the last iteration of step /2/ of the calibration method according to an embodiment of the present invention.

In this step 11, provision is also made to initialize a variable i at the value zero.

Then, in a step 12, a drift value of the measurement is determined in the current vibration position of the vibratory gyroscope undergoing calibration. This drift value corresponds to a difference D between the measurement value provided by the vibratory gyroscope undergoing calibration and that provided on the basis of a combination of the measurements from the other gyroscopes along the same measurement axis.

In a subsequent step, step 13, a change in position of the vibration position of the vibratory gyroscope is commanded among one of the other vibration positions of the plurality considered, then another measurement drift value is determined, just as in step 12 but in relation to the new vibration position of the vibratory gyroscope to be calibrated.

On completion of step 13, two drift values are therefore available respectively for two distinct vibration positions of the vibratory gyroscope. In order to be able to construct a drift model as a function of vibration position, which makes it possible, in continuous manner, to produce a correspondence between a vibration position and a drift value, step 13 is repeated at least once more. Thus, in an embodiment of the present invention, the drift model can be constructed based on at least three drift values.

To this end, in a step 14, the number i is compared to a positive integer K. The choice of the value K is based on a compromise between the complexity of the implementation of the method, also comprising the time that this implementation requires, and the precision of the drift model finally obtained. In fact, determining a large number of drift values is expensive but makes it possible to obtain a precise drift model.

In the event that i is less than K, the value of the number i is incremented by the value 1 in a step 16 before iterating step 13. On each iteration of this step 13, a new drift value is obtained for the current vibration position that has just been commanded on the vibratory gyroscope undergoing calibration.

This step 13 is repeated as long as the control step 14 is satisfied.

On completion of these repetitions of step 13, K+2 drift values are available, based on which it is then possible to determine a drift model.

It is then possible to generate the drift model as a function of the vibration positions of the vibratory gyroscope in such a way as to be able to correct the measurement values provided by this gyroscope in any vibration position. It is for example possible to apply to the series of the drift values thus obtained, a harmonic analysis, or a polynomial analysis in order to obtain a continuous drift model bases on the series of discrete drift values.

The following sections describe an application, by way of example, of the present invention in a context of calibration of vibratory gyroscopes within an inertial unit comprising four vibratory gyroscopes and providing an orientation reference of a carrier.

The calibration step comprises the change in vibration position of the vibratory gyroscope to be calibrated. Thus, while one of the four vibratory gyroscopes is undergoing calibration, the measurements provided by the at least three other vibratory gyroscopes are used to correct the measurement provided by the vibratory gyroscope to be calibrated. The gyroscopic system can therefore provide an orientation reference on the basis of the same three gyroscopes of the system even during a calibration step.

The calibration operation consists of placing the vibration of the vibratory gyroscope considered in various positions and reading the corresponding measurement from the vibratory gyroscope to be calibrated. It is then sufficient to subtract from these measurements the actual rotation of the carrier of the inertial unit, this actual rotation being measured by the other three gyroscopes. This operation is then successively repeated for the set of the vibratory gyroscopes of the system that one wishes to calibrate according to an embodiment of the present invention.

The calibration of the vibratory gyroscopes of the inertial unit can be carried out successively as follows.

The difference, denoted D, between the measurement value of the gyroscope undergoing calibration and the measurement value provided along the same axis by a linear combination of the measurements from the other gyroscopes is calculated in such a way that a fictitious measurement axis collinear with the axis of the gyroscope undergoing calibration is thus reconstituted. The calculation of this difference D is carried out during the period when a command for a change in vibration position is applied to the vibratory gyroscope to be calibrated.

The difference D makes it possible to know precisely an angle value by which the vibration position has rotated, even when the scale factor having served to generate the change in position is not itself precisely known. It is then possible to subtract this apparent rotation measured by the gyroscope undergoing calibration from the navigation calculations.

This calculation is also carried out during the period when the vibration is left in a given position. In this manner, by applying a position change command, the vibration position can be modified according to a plurality of vibration positions and the value of D is recorded for each of the positions of the plurality of positions. This provides a measurement error value of the vibratory gyroscope as a function of the vibration position, which makes it possible to update a harmonic model of the error drift.

Such a procedure makes it possible to use the same three gyroscopes for the navigation, the corrections being introduced via the updating of the corresponding drift model, and thus to avoid switching transients, i.e. measurement instabilities linked to a change in gyroscopes used by the gyroscopic system in order to provide navigation information.

It can advantageously be provided that, in the event of significant movements of the carrier disturbing the planned positions of the vibration of a vibratory gyroscope undergoing calibration, the updating of the drift model is cancelled and deferred to a subsequent sequence.

By application of the principles of the present invention to an inertial unit, and to the calibration of vibratory gyroscopes in this inertial unit, it is possible to proceed in a transparent manner with calibrations at any time in the use of the unit. Such a gyroscopic system can provide an orientation reference even when one of the vibratory gyroscopes is undergoing calibration according to an embodiment of the present invention.

Figure 2:
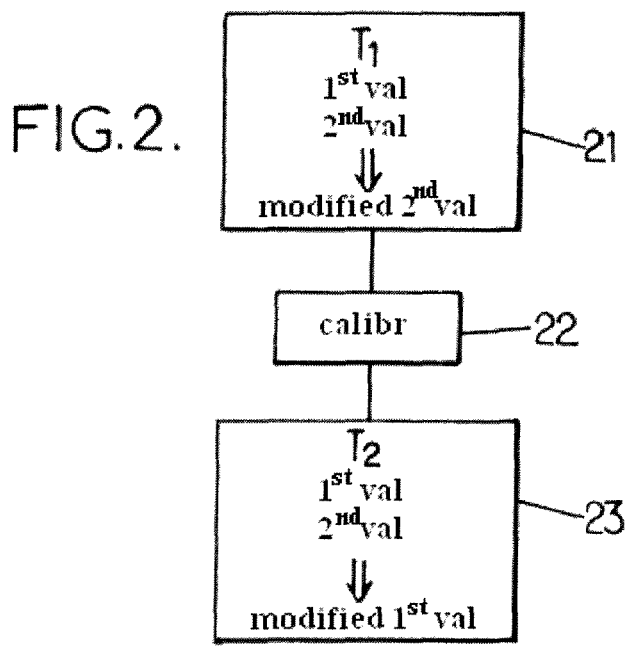
FIG. 2 illustrates an implementation of the calibration method in a gyroscopic system according to an embodiment of the present invention.

FIG. 2 illustrates an implementation of the calibration method in a gyroscopic system according to an embodiment of the present invention, wherein the gyroscopes provides angle measurements, and wherein the navigation information provided by the gyroscopic system is based on three out of the four gyroscopes that are not undergoing calibration. Thus, in this case, it is not always the same gyroscopes that are used to provide the navigation information.

In a step 21, simultaneously over a period of time T1, along the same measurement axis, first angle values are provided by the gyroscope to be calibrated and second angle values are obtained from a linear combination of the measurements provided by the other three gyroscopes. On the basis of these two types of angle values, it is then possible to modify the second angle values, in order to make them consistent with the first angle values by adapting the associated zero reference.

Thus, it is possible to ensure an angular continuity in the measurement values provided by the gyroscope to be calibrated and a combination of the other gyroscopes.

In a step 22, the main steps of the calibration method are carried out while the measurement values provided by the gyroscopic system are obtained from the other gyroscopes.

On completion of this calibration, it is possible either to make provision to continue to provide angle values obtained from the other gyroscopes over a certain period of time, or to resume taking into account the angle values obtained from the vibratory gyroscope that has just been calibrated. The latter can vibrate in the previous position wherein it was vibrating before the calibration of this gyroscope was carried out, or in a different vibration position.

If it is decided to resume taking into account the measurement values provided by the vibratory gyroscope that has just been calibrated, then, in step 23, both the first and second angle values are taken into consideration in order to be able to modify the first angle values provided by adapting the respective zero references.

Figure 3:
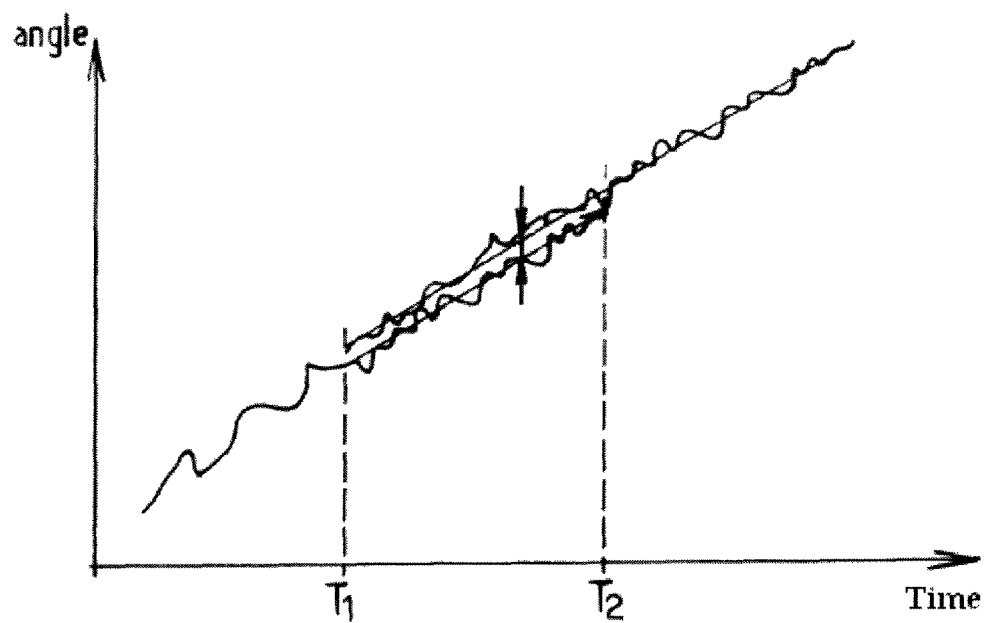
FIG. 3 illustrates the changes in the measurement values provided by a gyroscopic system according to an embodiment of the present invention.

FIG. 3 illustrates the changes in the measurement values provided by a gyroscopic system according to an embodiment of the present invention with reference to the implementation of the calibration method described above with reference to FIG. 2.

The variation in the angle values taken into consideration by a gyroscopic system according to an embodiment of the present invention is described as a function of time in the course of the steps of the measurement method.

Here, before a time $T_1$, the angle values are provided by the vibratory gyroscope to be calibrated. Then between the times $T_1$ and $T_2$, the first and second angle values are taken into account in order to obtain modified second angle values so as to adapt the respective zero references.

This period therefore corresponds to an overlap period that is used for the consistency of the angle values used by the system over time.

Then, at the end of this overlap period, it is possible to command a change in vibration position of the gyroscope to be calibrated. The measurement system then uses the modified second measurement values.

Figure 4:
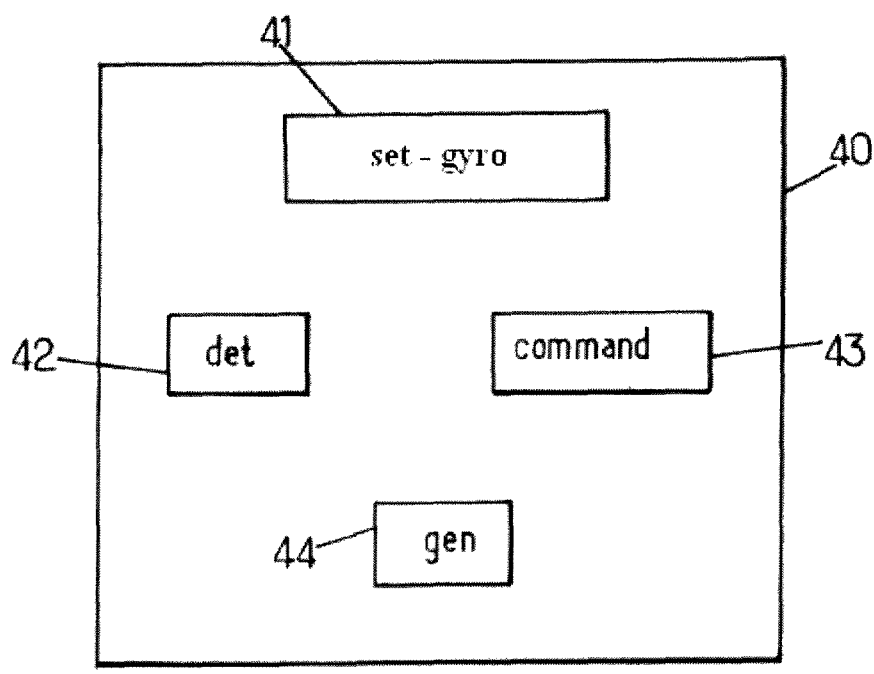
FIG. 4 illustrates a gyroscopic system according to an embodiment of the present invention.

FIG. 4 illustrates a gyroscopic measurement system according to an embodiment of the present invention.

This system 40 therefore comprises at least four vibratory gyroscopes 41 capable of changing vibration position among a plurality of vibration positions, a first measurement being provided by a gyroscope to be calibrated and a second measurement being provided by a combination of the respective measurements from the other gyroscopes, these first and second measurements being carried out along the same measurement axis.

It also comprises:
 a determination unit 42 capable of determining a measurement drift value between the first measurement and said second measurement;
 a command unit 43 capable of commanding the change in vibration position of the gyroscope to be calibrated to another vibration position among the plurality of vibration positions and requiring the determination of a drift value by the determination unit; and
 a generation unit 44 capable of generating a drift model as a function of the vibration position of the gyroscope to be calibrated on the basis of the drift values provided by the determination unit.

The three vibratory gyroscopes can be arranged along three orthogonal axes respectively and the fourth vibratory gyroscope along the trisectrix of said three orthogonal axes.

The invention claimed is:

1. Method of calibrating at least three gyroscopes to be calibrated in a gyroscopic system comprising at least four vibratory gyroscopes capable of changing vibration position among a plurality of vibration positions;
 a first measurement being provided by each of said at least three gyroscopes to be calibrated and a second measurement being provided by a combination of the respective measurements from the other gyroscopes of said system, said first and second measurements being carried out along the same measurement axis;
 said calibration method comprising the following steps, for each of the at least three gyroscopes to be calibrated which vibrates in one of the vibration positions:
  /1/ determining a measurement drift value between said first measurement and said second measurement;
  /2/ commanding the change in vibration position of the gyroscope to be calibrated to another vibration position of said plurality of vibration positions and iterating step /1/;
  /3/ iterating step /2/ K times, K being a positive integer; and
  /4/ generating a drift model as a function of the vibration position of the gyroscope to be calibrated on the basis of the drift values obtained in the iterations of step /1/;
 wherein the at least three gyroscopes to be calibrated are calibrated by generation of a drift model by applying step /1/ to each of the gyroscopes successively, then step /2/ to each of the gyroscopes successively, then step /3/ to each of the gyroscopes successively and finally step /4/ to each of the gyroscopes successively.

2. Calibration method according to claim 1, wherein, the gyroscopic system comprising four vibratory gyroscopes, three vibratory gyroscopes are arranged along three orthogonal axes respectively and the fourth vibratory gyroscope is arranged along the trisectrix of said three orthogonal axes.

3. Calibration method according to claim 1, wherein, after step /4/, the measurements provided by the vibratory gyroscope, for which a drift model has been generated in step /4/, are corrected on the basis of said drift model.

4. Calibration method according to claim 1, wherein a specific drift value is obtained by also carrying out step /1/ over a period of time corresponding to the change in vibration position of the gyroscope to be calibrated, said specific drift value being used in order to calibrate a scale factor of the gyroscope to be calibrated.

5. Calibration method according to claim 1, wherein, the gyroscopic system providing navigation information on the basis of respective measurements from a set of at least three determined vibratory gyroscopes, during the implementation of steps /1/ to /4/ on a gyroscope to be calibrated among said set, the measurement from the gyroscope to be calibrated, on the basis of which the navigation information is provided, is replaced by a measurement along the same measurement axis as said gyroscope to be calibrated, obtained by combining the respective measurements from the other two vibratory gyroscopes of said set and from at least one fourth vibratory gyroscope.

6. Calibration method according to claim 1, wherein, the gyroscopic system providing navigation information on the basis of respective measurements from a set of at least three specific vibratory gyroscopes, during the implementation of steps /1/ to /4/on a gyroscope to be calibrated among said set, the measurement from the gyroscope to be calibrated, on the basis of which the navigation information is provided, is corrected on the basis of a combination of the measurements provided by the gyroscopes of said system other than the gyroscope to be calibrated.

7. Calibration method according to claim 1, wherein the drift model as a function of the vibration positions is obtained by one of a means of determination among an interpolation of the drift values obtained in the iterations of step /1/, a harmonic analysis of the drift values obtained in the iterations of step /1/ and a polynomial analysis of the drift values obtained in the iterations of step /1/.

8. Calibration method according to claim 1, wherein the measurement values relate to one measurement among a set of measurements comprising an angle measurement and an angular rate measurement.

9. Gyroscopic system comprising at least four vibratory gyroscopes capable of changing vibration position among a plurality of vibration positions; a first measurement being provided by one of at least three gyroscopes to be calibrated and a second measurement being provided by a combination of the respective measurements from the other gyroscopes of said system, said first and second measurements being carried out along the same measurement axis; said gyroscopic system comprising, in order to calibrate the gyroscope to be calibrated:

a determination unit capable of determining a measurement drift value between said first measurement and said second measurement;

a command unit capable of commanding the change in vibration position of the gyroscope to be calibrated to another vibration position of said plurality of vibration positions and requiring the determination of a drift value by the determination unit; and a generation unit capable of generating a drift model as a function of the vibration position of the gyroscope to be calibrated on the basis of the drift values provided by the determination unit;

wherein the at least three gyroscopes to be calibrated are calibrated by generation of a drift model by applying said determination unit to each of the gyroscopes successively, then said command unit K times, K being a positive integer to each of the gyroscopes successively, then said generation unit to each of the gyroscopes successively.

10. Gyroscopic system according to claim 9, comprising four vibratory gyroscopes, wherein three vibratory gyroscopes are arranged respectively along three orthogonal axes and the fourth vibratory gyroscope is arranged along the trisectrix of said three orthogonal axes.

11. Gyroscopic system according to claim 9, wherein measurements provided by a vibratory gyroscope, for which a drift model has been generated by the generation unit, are corrected on the basis of said drift model.

12. Gyroscopic system according to claim 9, providing navigation information on the basis of respective measurements from a set of at least three specific vibratory gyroscopes, wherein the measurement from the gyroscope to be calibrated, on the basis of which the navigation information is provided, is replaced by a measurement along the same measurement axis as said gyroscope to be calibrated, obtained by combining the respective measurements from the other two vibratory gyroscopes in said set and from at least one fourth vibratory gyroscope.

13. Gyroscopic system according to claim 9, providing navigation information on the basis of respective measurements from a set of at least three specific vibratory gyroscopes, wherein the measurement from the gyroscope to be calibrated, on the basis of which the navigation information is provided, is corrected on the basis of a combination of the measurements provided by the gyroscopes of said system other than the gyroscope to be calibrated.

* * * * *